(12) United States Patent
Tsai (10) Patent No.: US 8,169,776 B2
(45) Date of Patent: May 1, 2012

(54) FACE PANEL

(75) Inventor: Hui-Ching Tsai, Taipei Hsien (TW)

(73) Assignee: Chenbro Micom Co., Ltd., Taipei Hsien (TW)

( * ) Notice: Subject to any disclaimer, the term of this patent is extended or adjusted under 35 U.S.C. 154(b) by 231 days.

(21) Appl. No.: 12/662,208

(22) Filed: Apr. 6, 2010

(65) Prior Publication Data

US 2011/0242736 A1  Oct. 6, 2011

(51) Int. Cl.
*G06F 1/16* (2006.01)

(52) U.S. Cl. ............... 361/679.01; 160/135; 52/239; 312/348.1

(58) Field of Classification Search ............. 361/679.01, 361/679.55, 679.34, 679.05, 679.02, 679.26, 361/679.3, 679.58, 679.22, 679.27, 679.57, 361/679.41, 737; 160/371, 135; 52/268, 52/562, 239, 238.2, 656.1; 345/173, 174, 345/1.1, 8; 349/58, 95; 312/348.4, 348.1, 312/259, 215

See application file for complete search history.

(56) References Cited

U.S. PATENT DOCUMENTS 5,072,564 A * 12/1991 Campana .................. 52/656.1
5,339,968 A *  8/1994 Voelz ......................... 211/121

* cited by examiner

*Primary Examiner* — Hung Duong
(74) *Attorney, Agent, or Firm* — Bacon & Thomas, PLLC (57) ABSTRACT

A face panel includes a frame unit having mounting grooves arranged in parallel on the front side thereof, and decorative face members detachably fastened to the front side of the frame unit, each decorative face member having coupling devices protruded the back side thereof and detachably fastenable to the mounting groove of the frame unit, a decorative finish located on the front side thereof and carrying a design and a connection structure located on each of the two distal ends thereof for enabling a member of the decorative face members to be connected transversely in a line by means of forcing one connection structure of one decorative face member into engagement with one connection structure of another decorative face member.

6 Claims, 11 Drawing Sheets

FACE PANEL

BACKGROUND OF THE INVENTION

1. Field of the Invention

The present invention relates to face panel design for use in an electronic device and more particularly, to a face panel that can be conveniently rapidly assembled without any tools.

2. Description of the Related Art

Following fast development of computer technology, desk computers or notebook computers are intensively used in every corner of our society. Nowadays, different advanced computers of high power and high operation speed have been continuously created, and have appeared on the market for different applications. The modern society has become dependent on technology. In the society, electric and electronic devices are intensively used to control the fabrication, preparation or operation of clothing, food, living, transportation and entertainment. These electric and electronic devices have different shapes and different designs, and provide different functions. However, the face panels of conventional electric and electronic devices commonly have a simple, planar and monotonous design without attraction. Further, when mounting a face panel to an electric or electronic device or dismounting it from the electric or electronic device, a special tool may be used, i.e., the face panel designs of conventional electric and electronic devices commonly have the drawbacks as follows:

1. A conventional electric or electronic device or computer may be equipped with many different peripheral devices, such as hard disk drive, CD-ROM, card reader, etc., however the face panel simply has a planar design that adds little value to the quality of the product and gives no any decorative function.

2. The face panel of a conventional electric or electronic device may be affixed in place by means of screws. A screwdriver or special tool must be used when mounting or dismounting the screws.

SUMMARY OF THE INVENTION

The present invention has been accomplished under the circumstances in view. It is one object of the present invention to provide a face panel, which can be rapidly detachably assembled without any tools. It is another object of the present invention to provide a face panel, which causes a sense of beauty when used to decorate an electronic device.

To achieve these and other objects of the present invention, a face panel comprises at least one frame unit and at least one decorative face member mounted on the front side of the at least one frame unit. Each frame unit has at least one mounting groove located on the front side. Each decorative face member has at least one coupling device protruded the back side and detachably fastenable to the at least one mounting groove of the at least one frame unit, and a decorative finish located on the front side.

Further, each frame unit has at least one protruding connection portion located on each of the two distal ends thereof, and an end bar fastened to each of the two distal ends. Each end bar has at least one mounting hole for receiving the at least one protruding connection portion at one end of the respective frame unit.

Further, each decorative face member has a connection structure located on each of the two distal ends thereof. By means of forcing the connection structure at one end of one decorative face member into engagement with the connection structure at one end of another decorative face member, a number of the decorative face members can be connected transversely in a line.

DETAILED DESCRIPTION OF THE PREFERRED EMBODIMENT

Referring to FIGS. 1~5, a face panel in accordance with the present invention is shown comprising at least one frame unit 1 and at least one, for example, a plurality of decorative face members 2.

Each frame unit 1 has at least one, for example, a plurality of mounting grooves 11 located on the front side, and a protruding connection portion 12 disposed at each of the two distal ends of each mounting groove 11.

Each decorative face member 2 has at least one, for example, two coupling devices 21 protruded the back side thereof for coupling to the at least one mounting groove 11 of the frame unit 1, a decorative finish 22 located on the front side thereof, and a connection structure 23 located on each of the two distal ends thereof. Each connection structure 23 comprises at least one male connection member 231 and at least one female connection member 232.

During installation, the decorative face members 2 can be fastened to or detached from the frame unit 1 rapidly without any tools. By means of forcing the coupling devices 21 of the decorative face members 2 into engagement with the mounting grooves 11 of the frame unit 1, the decorative face members 2 are fastened to the frame unit 1. After installation, the decorative finishes 22 of the decorative face members 2 cause a sense of beauty.

Figure 1:
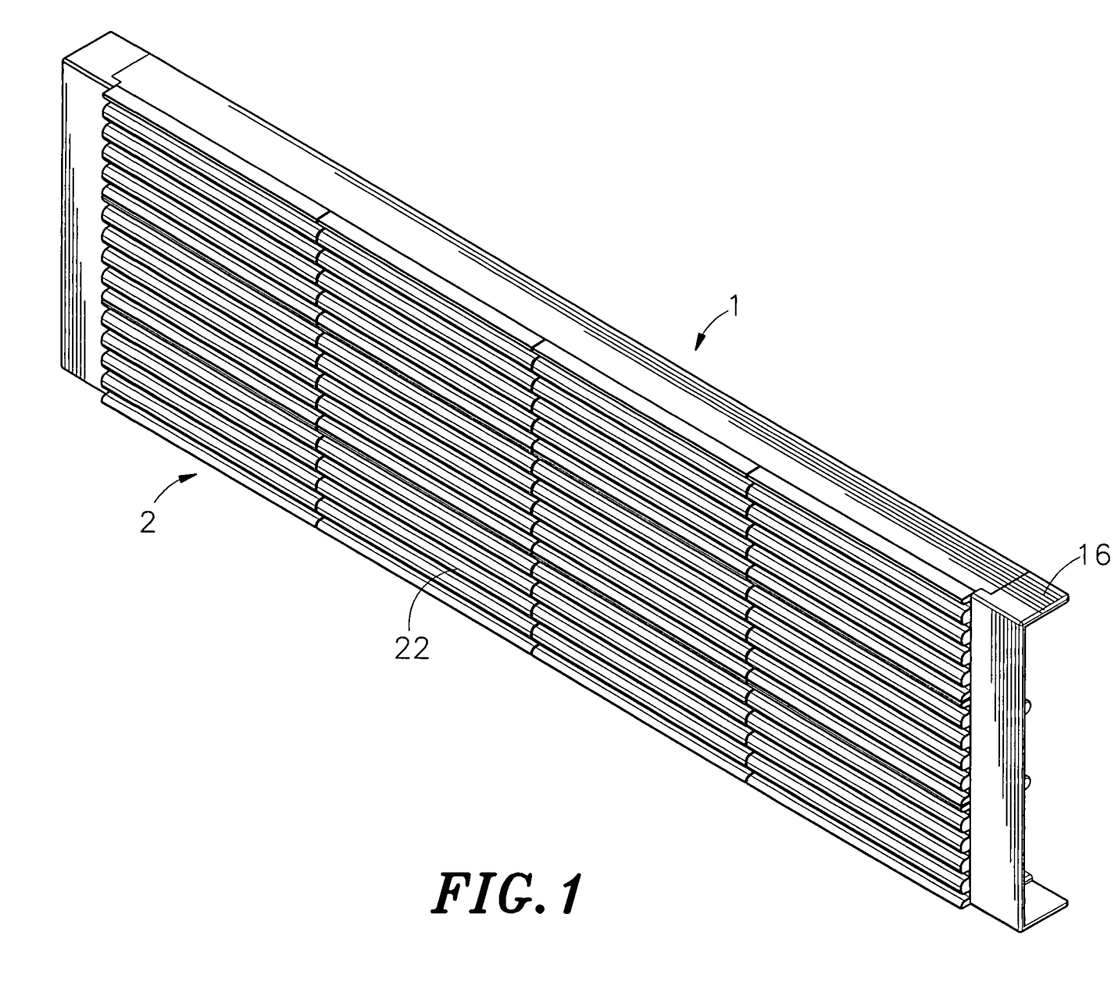
FIG. 1 is an oblique elevation of a face panel in accordance with a first embodiment of the present invention.
Figure 2:
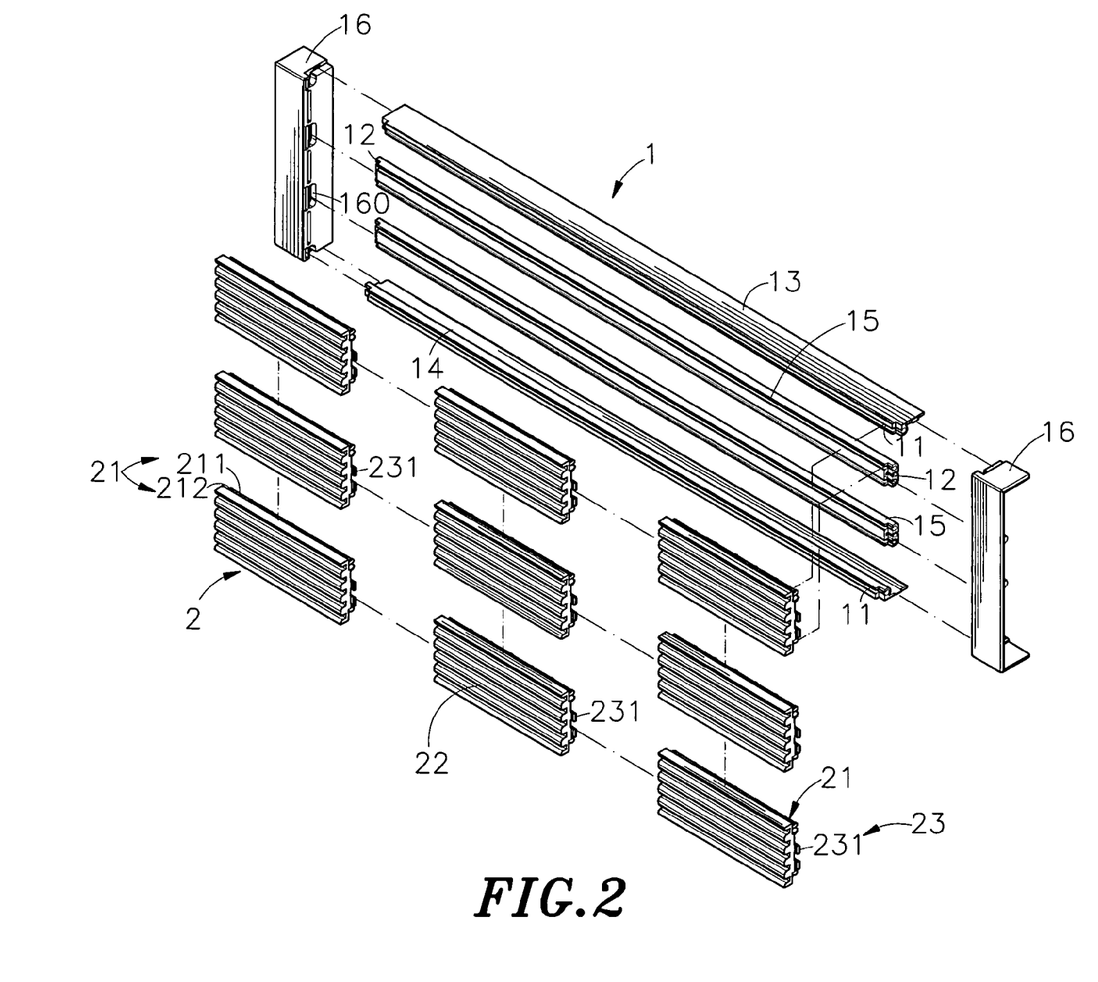
FIG. 2 is an exploded view of the face panel in accordance with the first embodiment of the present invention.
Figure 3:
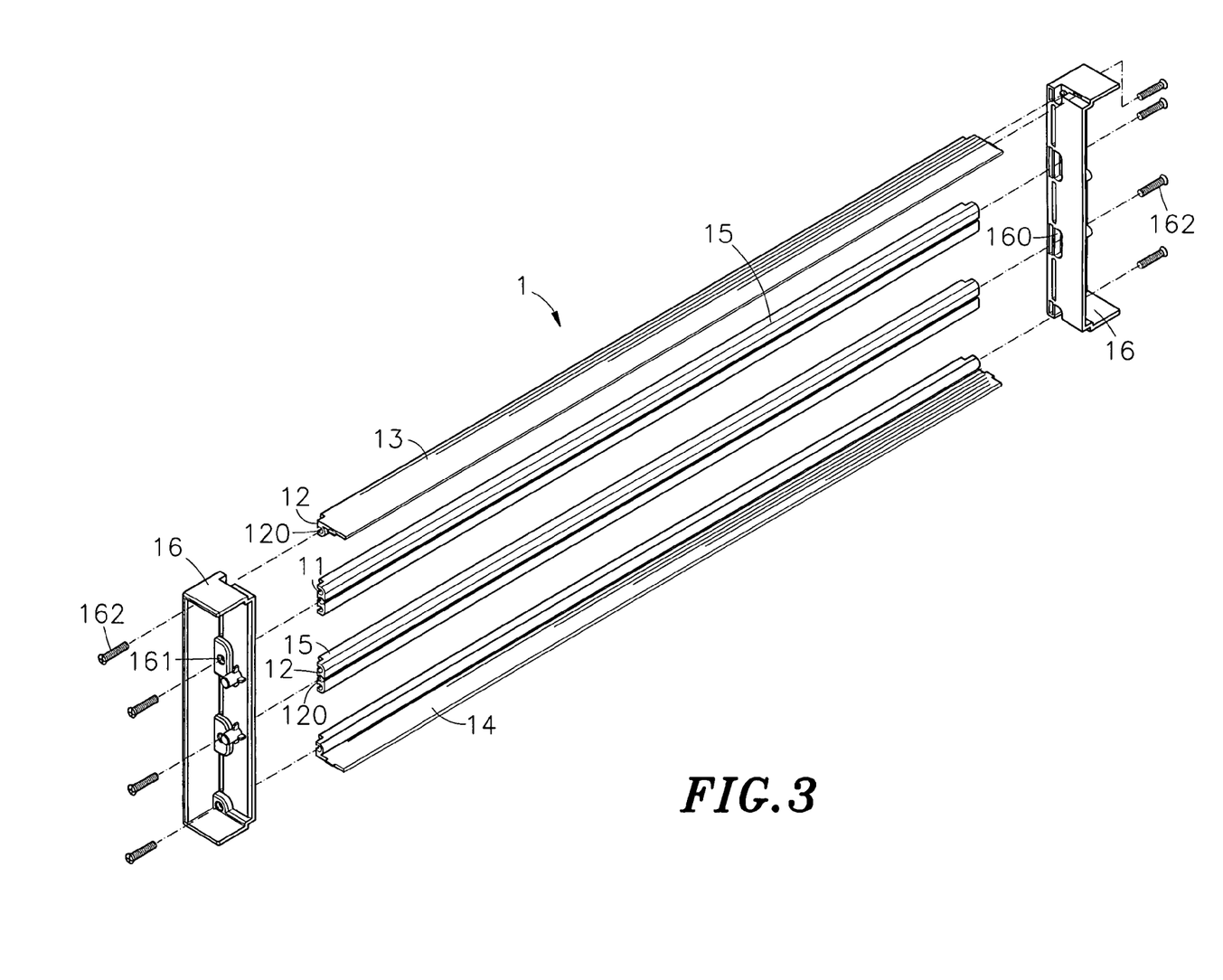
FIG. 3 is an exploded view of the frame unit for the face panel in accordance with the first embodiment of the present invention.
Figure 4:
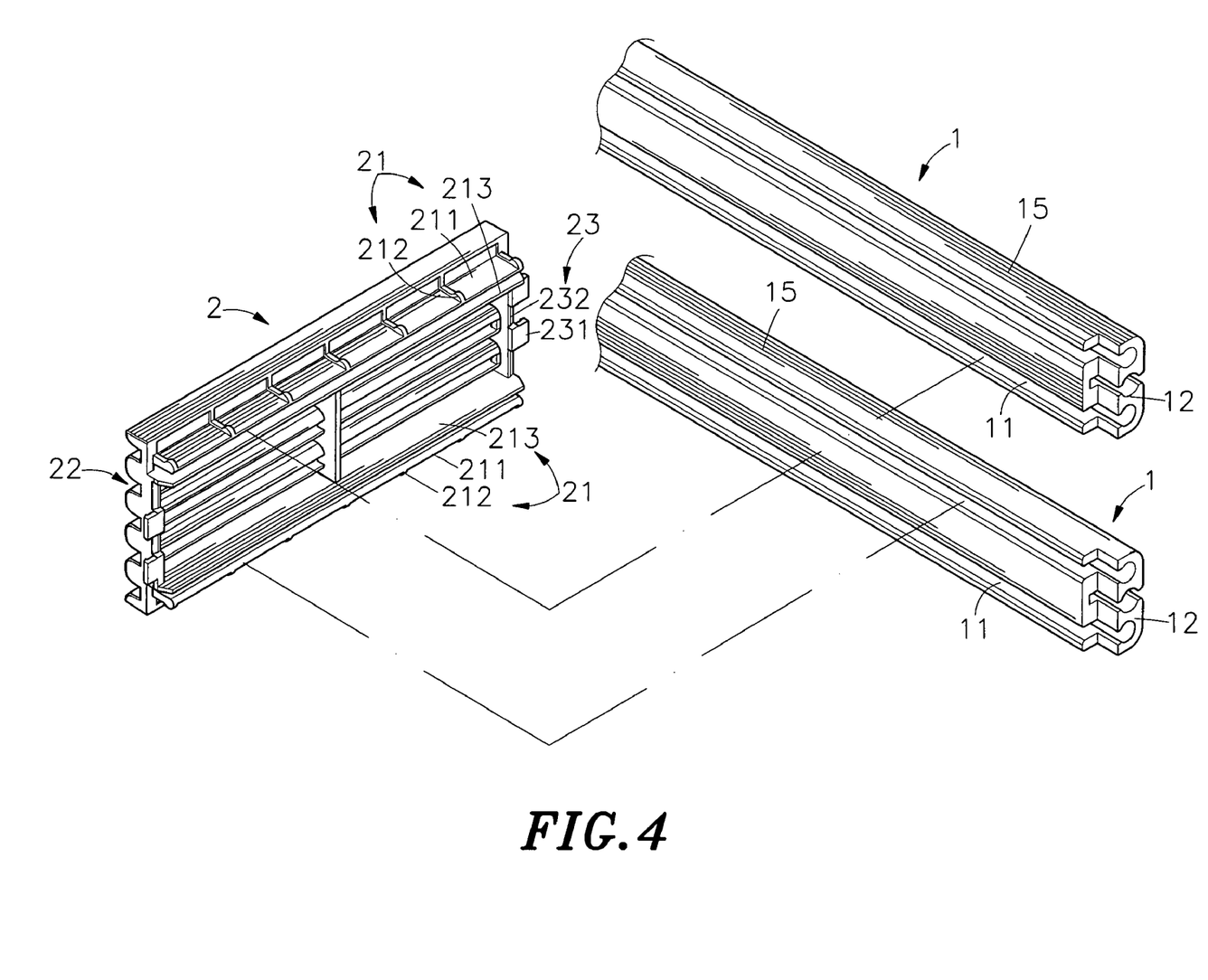
FIG. 4 is an exploded view in an enlarged scale of a part of the first embodiment of the present invention, showing the structure of the decorative face member and the intermediate frame bar.
Figure 5:
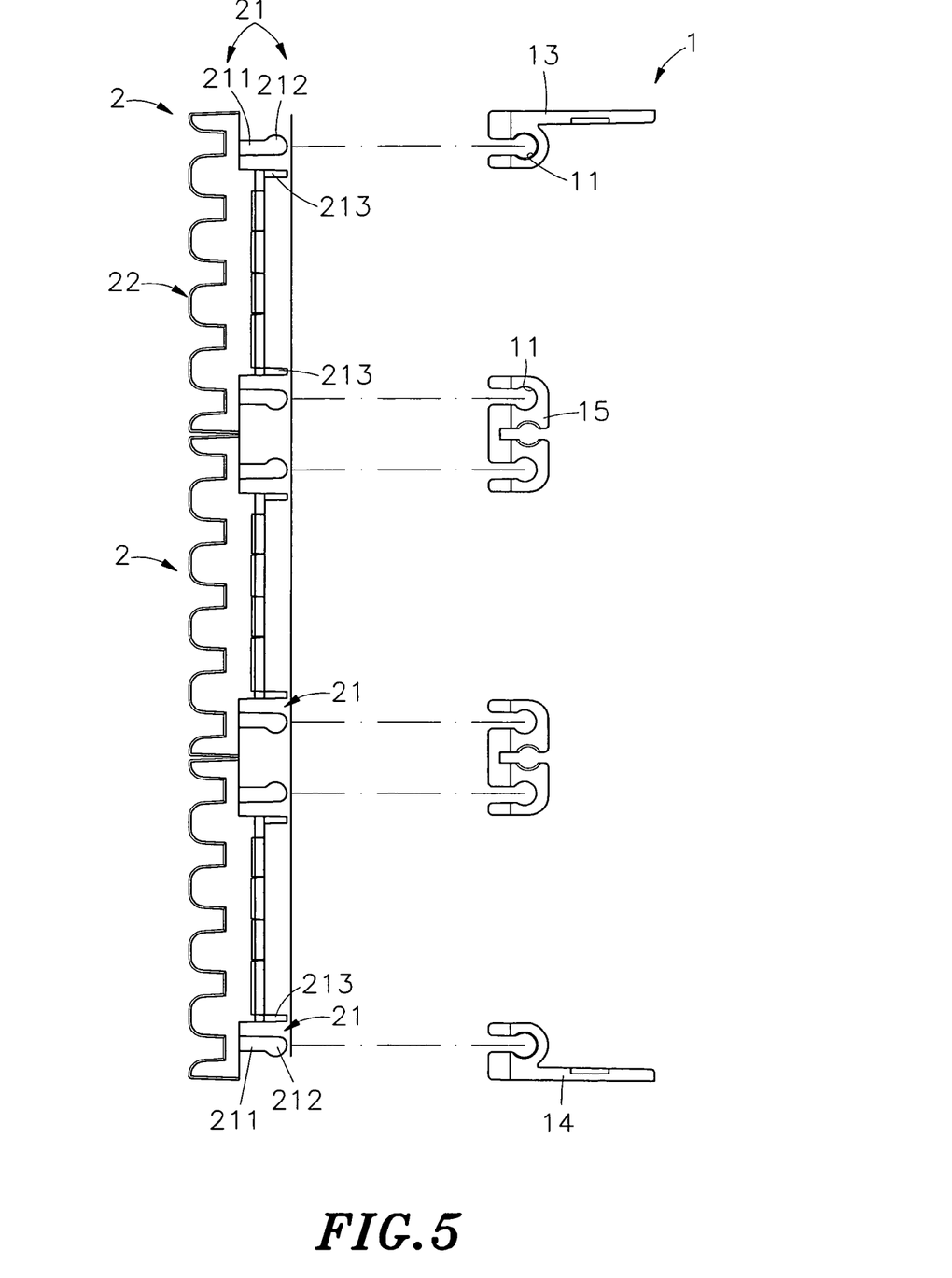
FIG. 5 is an exploded view in an enlarged scale of a part of the first embodiment of the present invention, showing the connection arrangement between the decorative face members and the frame unit.
Figure 6:
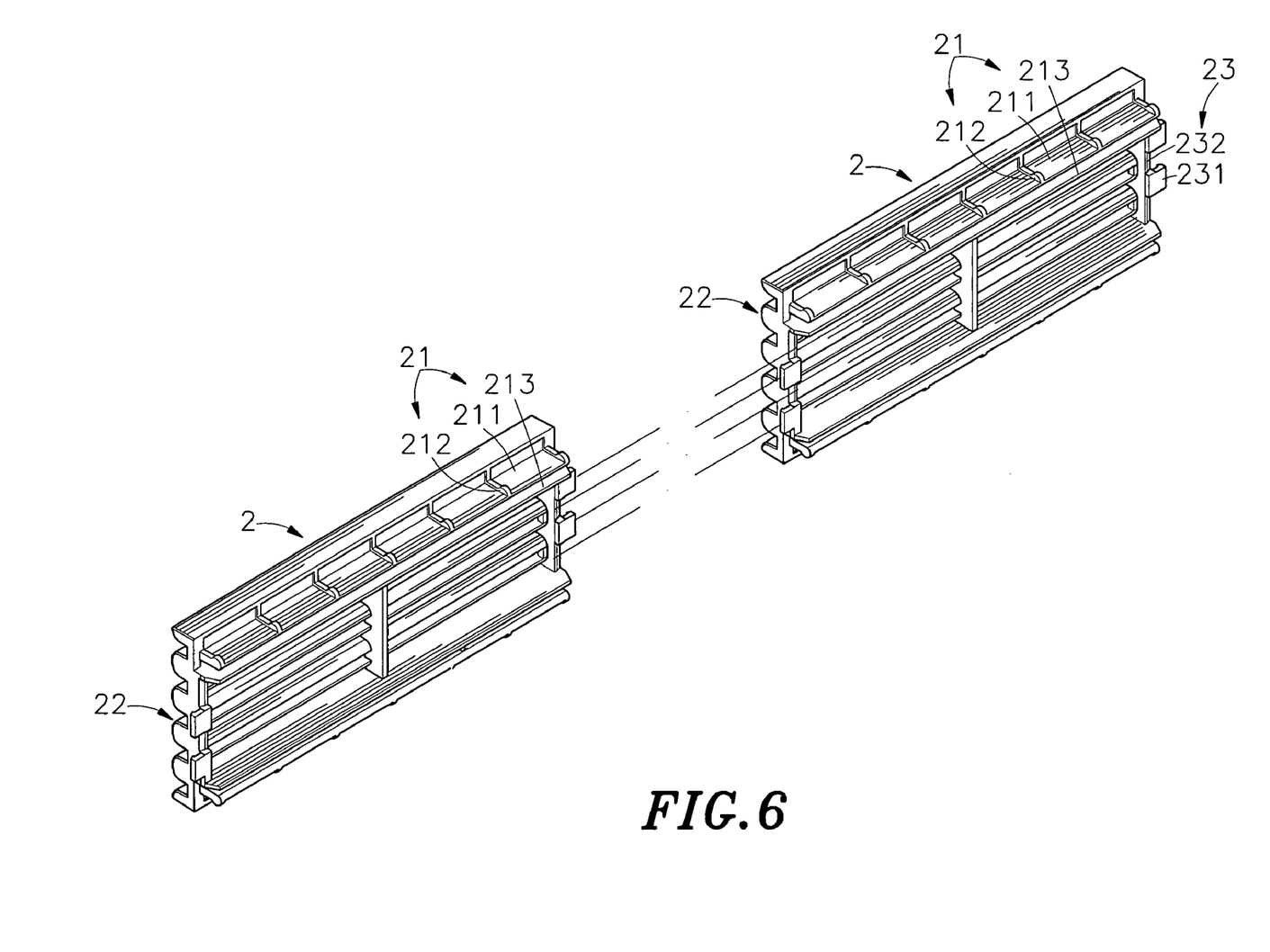
FIG. 6 is an exploded view in an enlarged scale of a part of the first embodiment of the present invention, showing the connection arrangement between two decorative face members.
Figure 7:
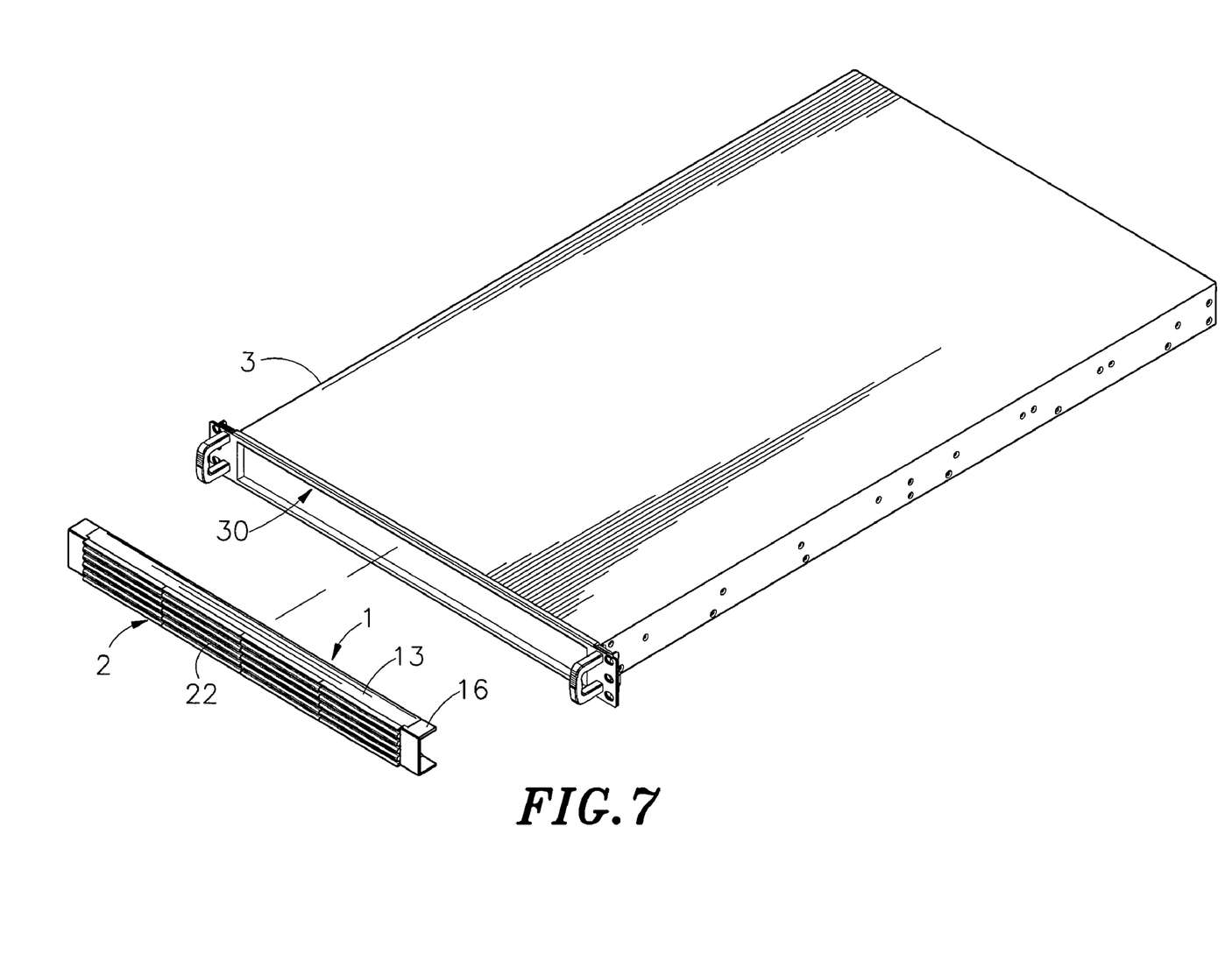
FIG. 7 shows an application example of a face panel in accordance with a second embodiment of the present invention.
Figure 8:
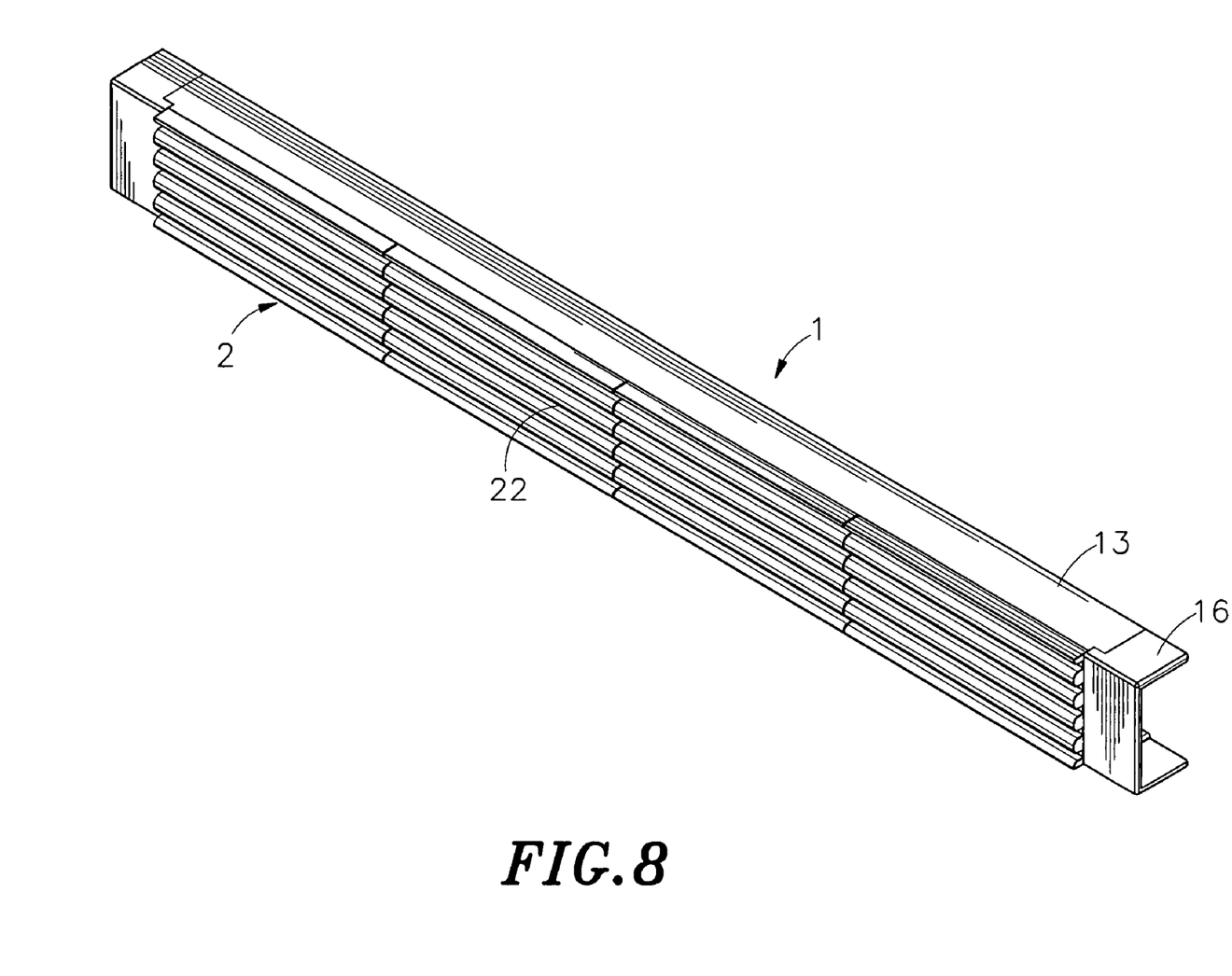
FIG. 8 is an oblique elevation in an enlarged scale of the face panel show in FIG. 7.
Figure 9:
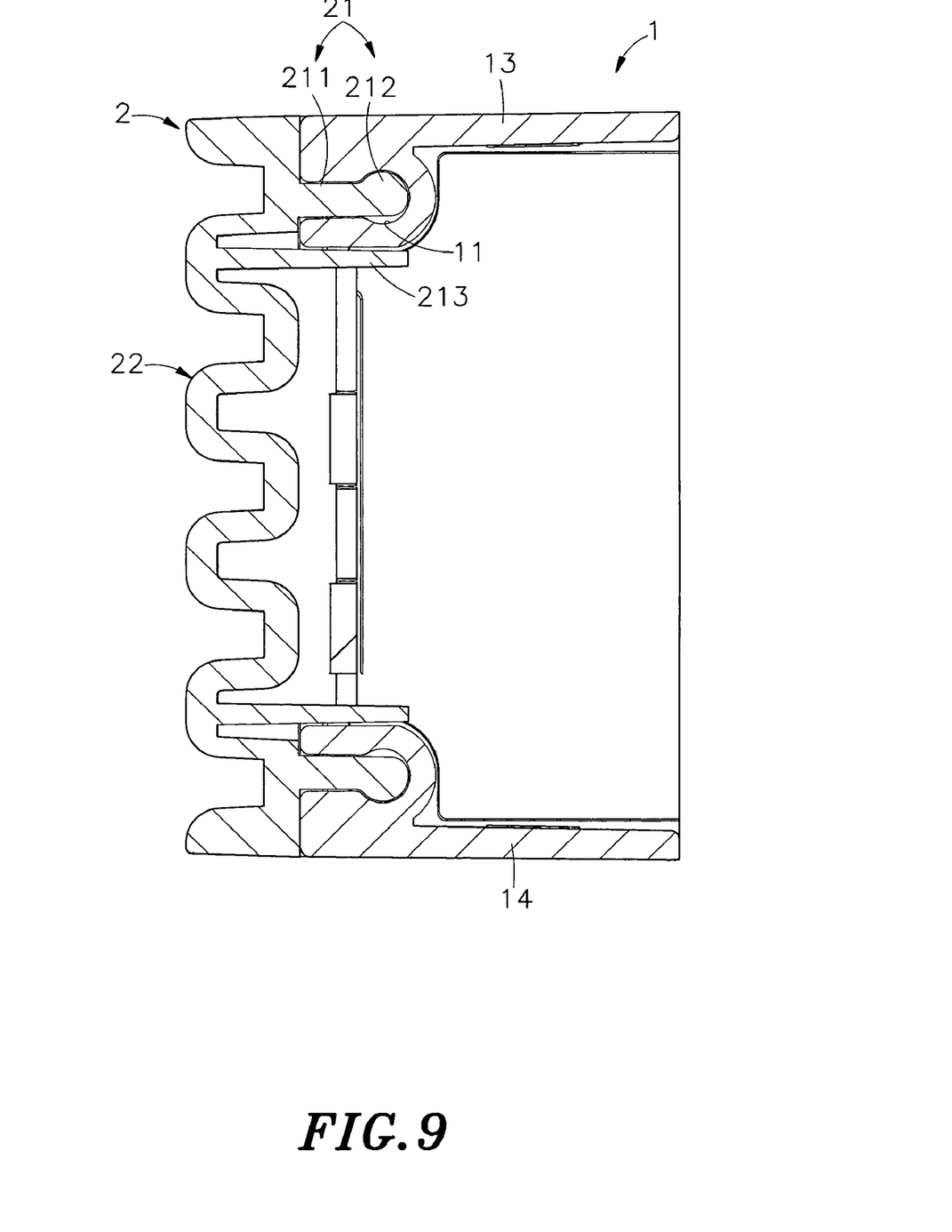
FIG. 9 is a cross-sectional view in an enlarged scale of the face panel shown in FIG. 8.

According to the preferred embodiment of the present invention, the frame unit 1 comprises a top frame bar 13, a bottom frame bar 14, at least one, for example, two intermediate frame bars 15 arranged between the top frame bar 13 and the bottom frame bar 14 at different elevations in a parallel manner, and two end bars 16 fastened to the two distal ends of each of the top frame bar 13, the intermediate frame bars 15 and the bottom frame bar 14. The top frame bar 13 and the bottom frame bar 14 each have one mounting groove 11 on the front side and one protruding connection portion 12 at each of the two distal ends of the mounting groove 11. Each intermediate frame bar 15 has two mounting grooves 11 on the front side and one protruding connection portion 12 at each of the two distal ends of each of the two mounting grooves 11. Further, each end bar 16 has a plurality of mounting holes 160 disposed at different elevations for receiving the protruding connection portions 12 of the frame unit 1. By means of forcing the coupling devices 21 of the decorative face members 2 into engagement with the mounting grooves 11 on the top frame bar 13, bottom frame bar 14 and intermediate frame bars 15 of the frame unit 1, the decorative face members 2 are fastened to the frame unit 1. Further, after insertion of the protruding connection portions 12 of the frame unit 1 into the mounting holes 160 of the end bars 16, screw nails 162 are inserted through respective mounting through holes 161 on the end bars 16 and threaded into respective mounting screw holes 120 on the protruding connection portions 12 to affix the end bars 16 to the top frame bar 13, intermediate frame bars 15 and bottom frame bar 14.

Referring to FIGS. 2 and 5 again, each decorative face member 2 has a rectangular shape, and two coupling devices 21 protruded the back side. Each coupling device 21 comprises a rectangular coupling tongue 211 protruded from the back side and extending along the length of the respective decorative face member 2, a rounded retaining rib 212 formed integral with the outer end of the rectangular coupling tongue 211, and a stop flange 213 protruded from the back side and extending along the length of the respective decorative face member 2 in a parallel manner relative to the rectangular coupling tongue 211. Further, the stop flanges 213 of the two coupling devices 21 of each decorative face member 2 are disposed at an inner side relative to the rectangular coupling tongues 211 of the two coupling devices 21. During installation, the rounded retaining rib 212 is inserted with the associating rectangular coupling tongue 211 of the associating coupling device 21 into one mounting groove 11 of the frame unit 1, and the stop flange 213 of each coupling device 21 is stopped against a part of the frame unit 1, enhancing connection stability. Further, a predetermined number of the decorative face members 2 can be connected transversely in a line by means of forcing the male connection members 231 of one decorative face member into engagement with the female connection members 232 of another. Further, the two mounting grooves 11 of each intermediate frame bar 1 are respectively fastened to the lower coupling device 21 of one upper decorative face member 2 and the upper coupling device 21 of one lower decorative face member 2 (see FIG. 5).

Referring to FIGS. 6~9, the face panel can be so arranged that the frame unit 1 simply comprises one top frame bar 13, one bottom frame bar 14 and two end bars 16 fastened to the two distal ends of each of the top frame bar 13 and the bottom frame bar 14. Further, a plurality of, for example, four decorative face members 2 connected transversely in a line by means of forcing the male connection members 231 of one decorative face member into engagement with the female connection members 232 of another. The connected series of decorative face members 2 are fastened to the top frame bar 13 and bottom frame bar 14 of the frame unit 1 by means of forcing the coupling devices 21 of the decorative face members into engagement with the mounting groove 11 at the top frame bar 13 and the mounting groove 11 at bottom frame bar 14. When the frame unit 1 and the decorative face members 2 are assembled, the face panel can then be fastened to a mounting recess 30 on the front side of an electronic device 3 (see FIG. 7), providing decoration.

Figure 10:
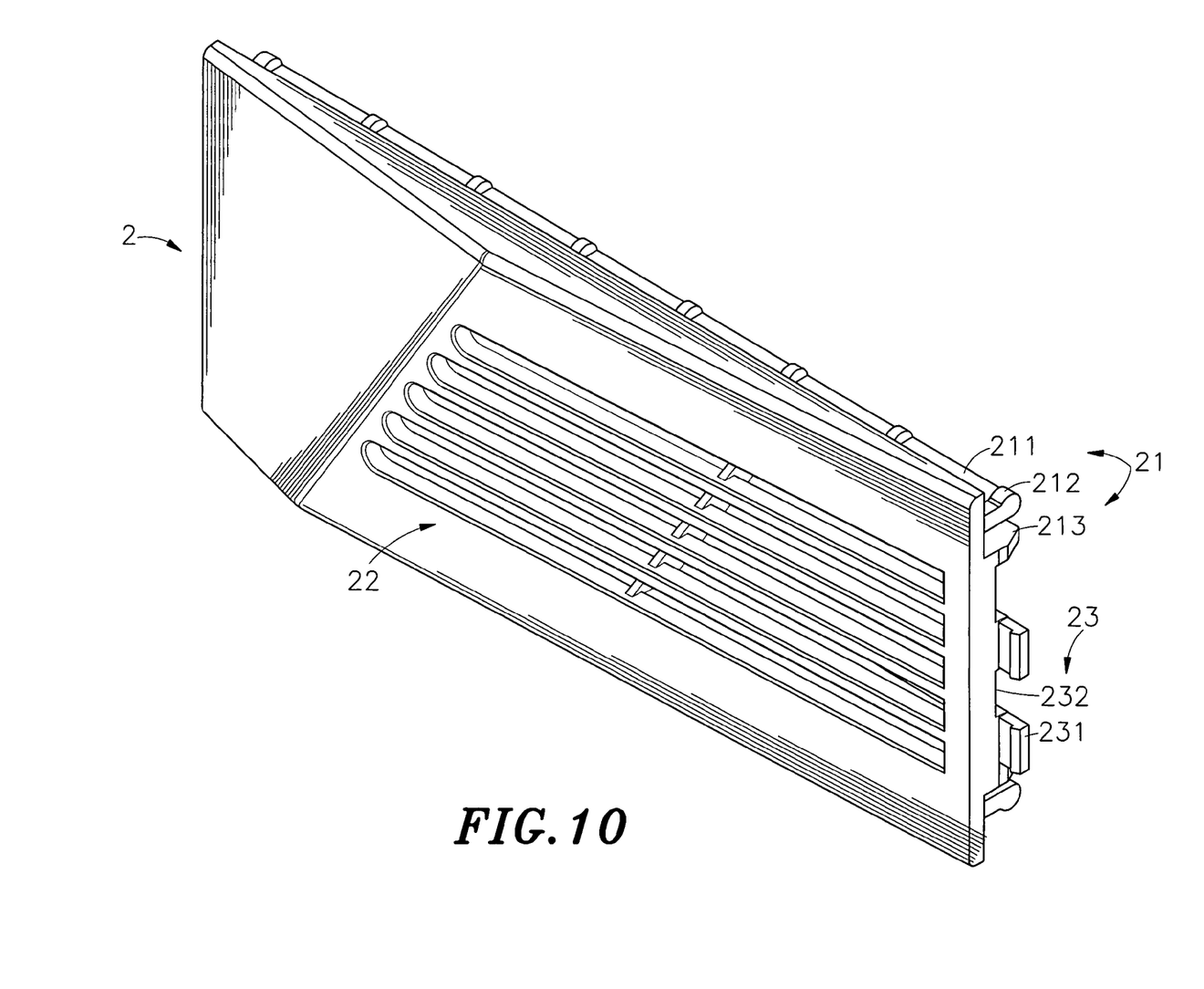
FIG. 10 is an oblique elevation of a decorative face member for a face panel in accordance with a third embodiment of the present invention.
Figure 11:
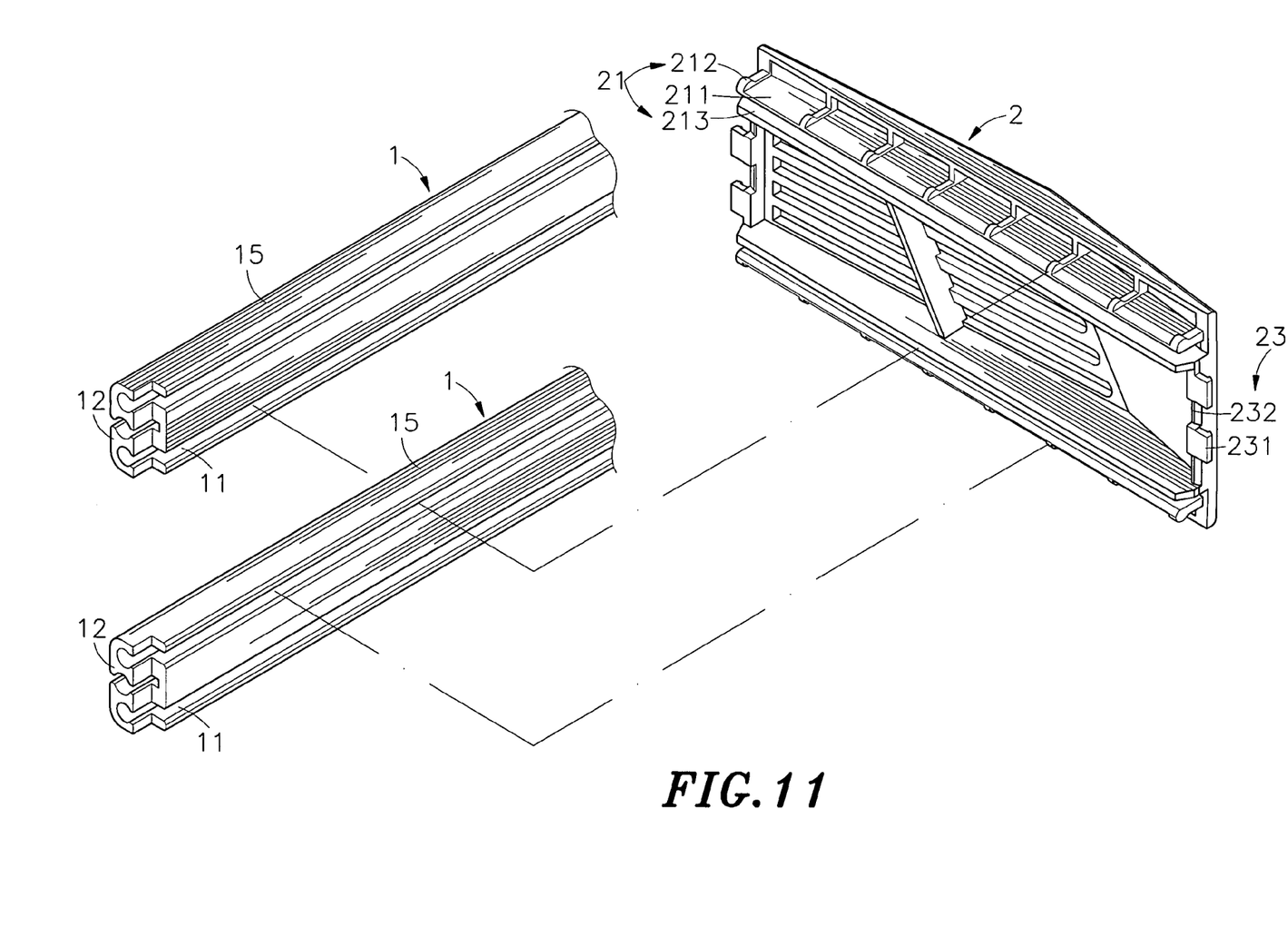
FIG. 11 is an exploded view of a part of the face panel in accordance with the third embodiment of the present invention.

Referring to FIGS. 10 and 11, the decorative finish 22 of each decorative face member 2 can be a double-bevel surface carrying a design, for example, a pattern of grooves, stripes, grains and/or openings. According to this embodiment, the decorative finish 22 a double-bevel surface having a pattern of openings made thereon.

As stated above, the invention provides a face panel, which comprises at least one frame unit 1 having mounting grooves 11 arranged in parallel on the front side thereof, and a plurality of decorative face members 2 that are respectively fastened to the mounting grooves 11 of the frame unit 1 by coupling devices 21 that are protruded the back side of the decorative face members 2. Further, each decorative face member 2 has a decorative finish 22 located on the front side thereof, and a connection structure 23 at each of the two distal ends thereof. By means of connecting one connection structure 23 of one decorative face member 2 to one connection structure 23 of another decorative face member 2, a predetermined number of the decorative face members 2 are connected transversely in a line. Further, the frame unit 1 can be formed of a top frame bar 13, a bottom frame bar 14, a plurality of intermediate frame bars 15 arranged between the top frame bar 13 and the bottom frame bar 14 at different elevations in a parallel manner, and two end bars 16 fastened to the two distal ends of each of the top frame bar 13, the intermediate frame bars 15 and the bottom frame bar 14. Further, each end bar 16 has a plurality of mounting holes 160 disposed at different elevations for receiving protruding connection portions 12 at each of the two distal ends of each of the top frame bar 13, the bottom frame bar 14 and the intermediate frame bars 15. Further, the frame unit 1 can be formed of the top frame bar 13, the bottom frame bar 14 and the end bars 16 without the intermediate frame bars 15.

In conclusion, the invention provides a face panel that has advantages and features as follows:

1. The face panel is formed by means of assembling at least one frame unit 1 and at least one decorative face member 2 together. When the at least one frame unit 1 and the at least one decorative face member 2 are assembled together, the face panel thus obtained can then be fastened to the front side of an electronic device 3, causing a sense of beauty.

2. Each frame unit 1 has at least one mounting groove 11 located on the front side. Each decorative face member 2 has at least one coupling device 21 protruded from the back side for fastening to the at least one mounting groove 11 of each frame unit 1. By means of forcing the at least one coupling device 21 of each decorative face member 2 into the at least one mounting groove 11 of each frame unit 1, the desired face panel can easily and rapidly be assembled without any tools.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A face panel, comprising:
   at least one frame unit, each said frame unit having at least one mounting groove located on a front side thereof; and
   at least one decorative face member detachably fastened to the front side of said at least one frame unit, each said decorative face member having at least one coupling device protruded a back side thereof for coupling to the at least one mounting groove of said at least one frame unit and a decorative finish located on a front side thereof.

2. The face panel as claimed in claim 1, wherein the number of said at least one frame unit is multiple and the multiple frame units are arranged adjacent to one another; the number of said at least one decorative face member is multiple and the multiple decorative face members have the respective coupling devices thereof respectively fastened to the mounting grooves of the multiple frame unit.

3. The face panel as claimed in claim 1, wherein each said frame unit has at least one protruding connection portion located on each of two distal ends thereof adjacent to one end of each said mounting groove, and an end bar fastened to each of the two distal ends, each said end bar having at least one mounting hole for receiving the at least one protruding connection portion at one end of the respective frame unit.

4. The face panel as claimed in claim 1, wherein each said coupling device of each said decorative face member comprises a rectangular coupling tongue protruded from the back side and extending along the length of the respective decorative face member, a rounded retaining rib formed integral with an outer end of said rectangular coupling tongue for insertion with said rectangular coupling tongue into one mounting groove of one said frame unit, and a stop flange protruded from the back side and extending along the length of the respective decorative face member in a parallel manner relative to said rectangular coupling tongue.

5. The face panel as claimed in claim 1, wherein each said frame unit comprises a top frame bar, a bottom frame bar, at least one intermediate frame bar arranged between said top frame bar and said bottom frame bar in a parallel manner, and two end bars fastened to two distal ends of each of said top frame bar, said at least one intermediate frame bar and said bottom frame bar, said top frame bar and said bottom frame bar each carrying one said mounting groove on a front side thereof, each said intermediate frame bar carrying two said mounting grooves on a front side thereof.

6. The face panel as claimed in claim 1, wherein each said decorative face member has a rectangular shape and a connection structure located on each of two distal ends thereof, each said connection structure comprising at least one male connection member and at least one female connection member.

* * * * *